Sept. 20, 1966    B. G. KEDDIE    3,273,612
MITER BOX WITH MAGNETIC SAW GUIDES
Filed Jan. 10, 1964
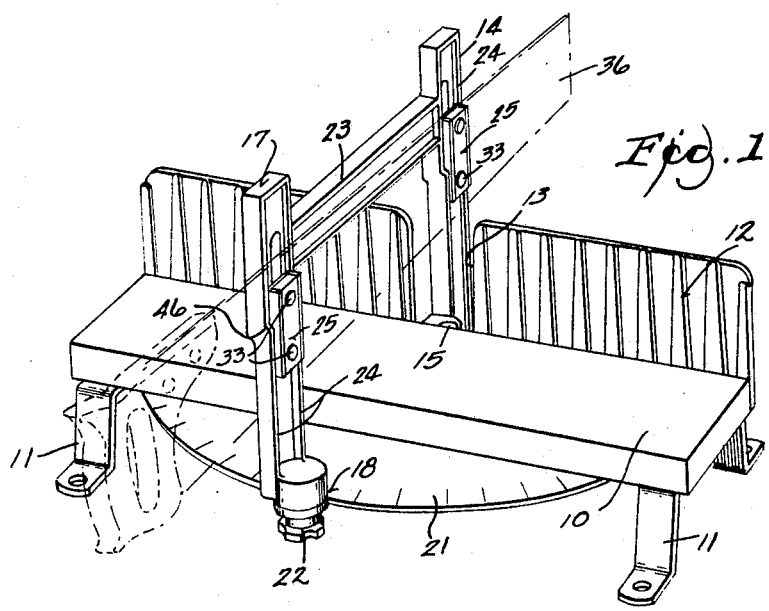
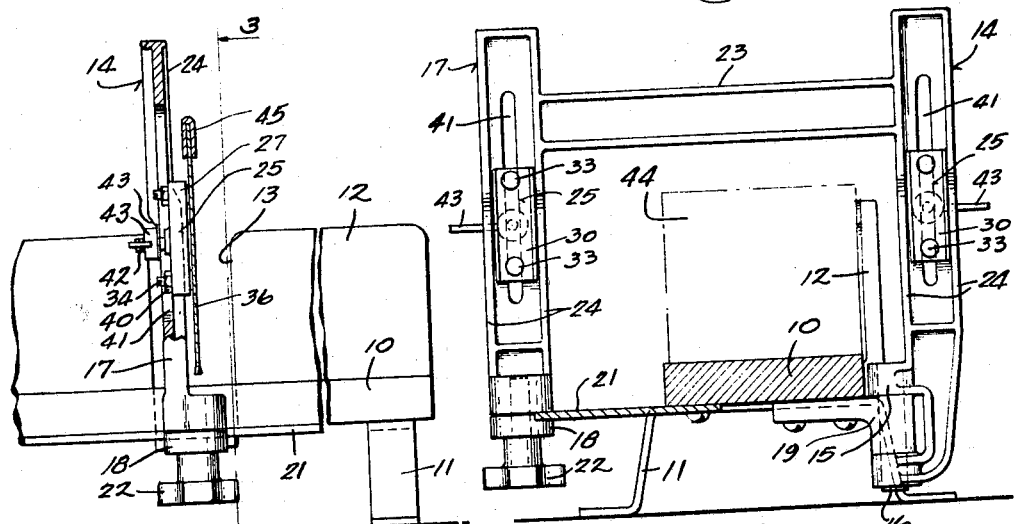
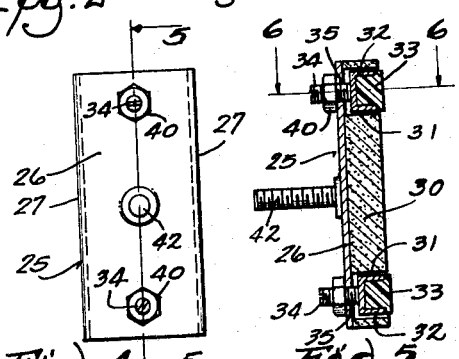 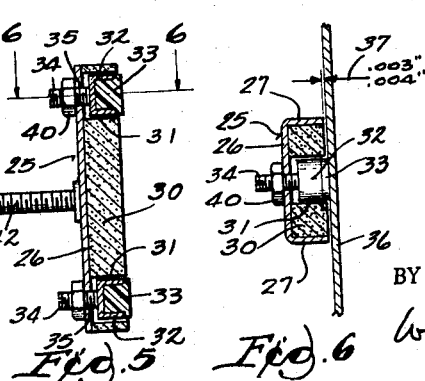
INVENTOR.
BURTON G. KEDDIE
BY
Wheeler, Wheeler & Wheeler
ATTORNEYS

United States Patent Office 3,273,612
Patented Sept. 20, 1966

3,273,612
MITER BOX WITH MAGNETIC SAW GUIDES
Burton G. Keddie, Brookfield, Wis., assignor to Hempe Manufacturing Company, Inc., Milwaukee, Wis., a corporation of Wisconsin
Filed Jan. 10, 1964, Ser. No. 337,027
12 Claims. (Cl. 143—89)

This invention relates to a miter box with magnetic saw guides.

In accordance with the present invention, the saw blade is accurately guided on its path by magnetic guides which hold the saw in proper cutting relationship to the work and which permit reciprocating movement of the saw. Miter boxes embodying the present invention dispense with saw guide parts which would otherwise tend to become worn in use. Miter boxes embodying the present invention are much simpler and less expensive to fabricate than prior art devices incorporating relatively complex mechanical means to guide the saw on its path of travel.

The magnetic saw guides of the present invention are mounted on front and rear supports and are adjustable vertically on said supports to readily accommodate the miter box to workpieces of different thicknesses. The guides have one side laterally unobstructed to permit easy placement and removal of the saw with respect to the miter box.

The magnetic saw guides of the present invention have vertically elongated poles, thus to provide relatively extensive surfaces oriented in a vertical direction to support the saw against tipping and to hold it in a true vertical path.

In preferred embodiments of the invention, the magnetic saw guides are provided with anti-friction bearing means which hold the saw spaced slightly from the poles a distance insufficiently far to substantially impair the magnetic attraction between the poles and the blade. Accordingly, the saw blade will easily glide over the anti-friction bearings but will nevertheless be magnetically held in predetermined position for proper coaction with the work.

Other objects, features and advantages of the invention will appear from the following disclosure in which:

FIGURE 1 is a perspective view of a miter box embodying the present invention.

FIGURE 2 is a fragmentary front elevation of the miter box of FIGURE 1, portions of the front saw guide support being shown in vertical cross section.

FIGURE 3 is a cross section taken along the line 3—3 of FIGURE 2.

FIGURE 4 is a rear elevation of one of the magnetic saw guides.

FIGURE 5 is a cross section taken along the line 5—5 of FIGURE 4.

FIGURE 6 is a fragmentary plan view showing the relationship between a saw blade and a saw guide magnet, the magnet being shown in horizontal cross section.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The miter box desirably consists of the usual work table 10 supported on legs 11 and having a squaring fence 12 which has a gap 13. Offset slightly behind the gap 13 a rear saw guide support or mast 14 is pivotally mounted on trunnions 15 which rotate on the axis of the pin 16 which may turn in fixed knuckle 19.

Swingably mounted at the front of the miter box is a front saw guide support or mast 17 having at its lower end a clamp 18 by which the front saw guide is adjustably fastened to the graduated sector 21. The clamp is actuated by a knob 22.

The front and rear saw guide supports 14, 17 are connected by a bridge or cross piece 23 so that both front and rear saw guide supports 14, 17 will remain in the same plane when swinging about the axis of pin 16 to adjust the angle of cut.

The respective saw guide supports 14, 17 are desirably channel-shaped in cross section and respectively have parallel flanges 24 which define therebetween vertical slideways in which the saw guide magnets 25 are partially embraced.

The magnets 25, which are best shown in FIGURES 4, 5 and 6, desirably each comprise a channel-shaped ferromagnetic pole piece 26 having flanges 27 which constitute spaced parallel magnetic poles. Between the poles 27 is disposed a block 30 of conventional permanent magnetic material to energize the magnetic poles. While the block 30 could be adhesively or otherwise mechanically attached to the channel-shaped pole piece 26, this will ordinarily be unnecessary because the two parts will be held together by magnetic attraction.

The block 30 is desirably provided with sockets or recesses 31 to receive mounting caps 32 which hold anti-friction plugs or bearings 33. The bearings 33 are desirably made of a self-lubricating material having a low co-efficient of friction, such as nylon or Teflon.

The caps 32 have rearwardly projecting threaded stems 34 which are adjustably engaged in threaded holes 35 in the rear wall of the pole piece 26. The caps are adjusted as shown in FIGURE 6 to project the anti-friction bearing surfaces 33 slightly beyond the plane of the exposed edges of the pole flanges 27 a distance far enough to hold the saw blade 36 away from contact with the magnet poles 27, but insufficiently far from the magnet poles 27 to substantially impair the magnetic attraction between the poles 27 and saw blade 36. In practice, this distance has been desirably set at approximately .003 or .004 inch, as indicated by the dimension arrow 37 of FIGURE 6. After the plugs 33 have been properly adjusted, they are held in position by the lock nuts 40.

The respective front and rear saw guide supports 14, 17 are provided midway between their spaced flanges 24 with vertically extending slots 41 to receive rearwardly projecting threaded stems 42 provided on the back plate of each magnet pole piece 26. A wing nut 43 is provided for each of the magnets 25, thus to permit adjustment of the respective magnets 25 vertically on the supports 14, 17.

Accordingly, where the work 44 is relatively thick, the magnetic saw guides 25 can be moved near the tops of saw guide supports 14, 17 and fixed in place by manipulating the thumb nuts 43. Where the work is relatively thin, or as the saw works downwardly through a thicker workpiece, the magnets 25 can be adjusted to a lower position.

As indicated in FIGURE 1, the saw blade 36 will be held in stable vertical position by the magnets 25. The poles 27 of the magnet are substantially vertically elongated to provide a stable support therefor. The anti-friction bearing surfaces 33 hold the saw just far enough away from the pole flanges 27 to eliminate any substantial drag on the free movement of the saw, but insufficiently far to preclude loss of magnetic attraction between the saw blade and the magnet.

To accommodate for saws having backs 45, as shown in FIGURE 2, the upper ends of the mast flanges 24 are desirably offset laterally, as shown at 46.

Another advantage of the independently adjustable plugs 33 relates to their use in correcting the tendency of an improperly sharpened saw to drift out of a plane perpendicular to the table 10. This frequently happens when the teeth at one side of the saw are sharper than at the other side of the saw. This can be corrected in miter boxes embodying the present invention by adjusting the plugs 33 to tilt the saw blade slightly in its vertical plane to compensate for any tendency it may have to drift, thus achieving a true cut, regardless of any improper sharpening of the saw.

I claim:

1. A miter box having a work table, front and rear saw blade guide supports, saw blade guides mounted on said supports, said saw blade guides comprising channel-shaped ferromagnetic pole pieces having laterally spaced vertically elongated flanges which constitute parallel magnetic poles and a block of permanent magnetic material between said flanges to energize said poles, said vertically elongated flanges providing magnetic attraction for a saw blade in various positions of vertical adjustment thereof.

2. The miter box of claim 1 in which said supports comprise ways transverse to the work table and along which the pole pieces are slideable toward and away from said table.

3. A miter box having a work table, front and rear saw blade guide supports, saw blade guides mounted on said supports, said saw blade guides comprising magnets and means for adjusting said magnets toward and away from said table, said magnets having poles and anti-friction bearing means extending slightly beyond said poles for spacing the saw blade from said poles a distance insufficiently far to substantially impair the magnetic attraction between the poles and the saw blade.

4. The miter box of claim 1 in which said supports have relatively offset upper and lower flange portions to accommodate for the back of a back saw.

5. A miter box having a work table, front and rear saw blade guide supports, saw blade guides mounted on said supports, said saw blade guides comprising magnets having poles and anti-friction bearing means extending slightly beyond said poles for spacing a saw blade from said poles a distance insufficiently far to substantially impair the magnetic attraction between the poles and the saw blade.

6. A saw blade guide magnet comprising poles and anti-friction bearing means extending slightly beyond said poles for spacing a saw blade from said poles a distance insufficiently far to substantially impair the magnetic attraction between the poles and the saw blade, the poles of said magnet being disposed in spaced parallel relation, said anti-friction bearing means comprising a plurality of plugs between the poles and spaced longitudinally thereof and having anti-friction surfaces exposed to the saw blade.

7. The device of claim 6 in which the magnet further comprises a channel having flanges which constitute said poles, and a filler block of magnetic material within the channel and between said poles, said filler block having recesses in which said plugs are disposed.

8. A miter box comprising a work table, front and rear saw blade guides comprising magnets having vertically elongated poles providing stable magnetic guides for a vertical saw blade, support means for said guides and means for adjusting said magnets toward and away from said table, said magnets further comprising anti-friction bearings extending slightly beyond said poles for spacing a saw blade from said poles a distance insufficiently far to substantially impair the magnetic attraction between the poles and the saw blade.

9. A miter box comprising a work table, front and rear saw blade guides comprising magnets having vertically elongated poles providing stable magnetic guides for a vertical saw blade, support means for said guides and means for adjusting said magnets toward and away from said table, said magnets further comprising anti-friction bearings extending slightly beyond said poles for spacing a saw blade from said poles a distance insufficiently far to substantially impair the magnetic attraction between the poles and the saw blade, the poles of said magnet being disposed in spaced parallel relation, said anti-friction bearing means comprising a plurality of plugs between the poles and spaced longitudinally thereof and having anti-friction surfaces exposed to the saw blade.

10. The miter box of claim 9 in which the magnet further comprises a channel having flanges which constitute said poles, and a filler block of magnetic material within the channel and between said poles, said filler block having recesses in which said plugs are disposed.

11. A miter box having a work table, front and rear saw blade supports, magnetic saw guides on said supports and respectively having vertically spaced separate upper and lower saw bearing portions and means for independently adjusting one of said bearing portions with respect to the other of said bearing portions to tilt the vertical plane in which the guides hold the saw.

12. The miter box of claim 11 in which said magnetic saw guides comprise vertically elongated poles, said upper and lower bearing portions comprising independently adjustable anti-friction plugs spaced vertically along said poles.

References Cited by the Examiner

UNITED STATES PATENTS

| | | | |
|---|---|---|---|
| 703,085 | 6/1902 | Prentice | 143—89 |
| 1,111,904 | 9/1914 | Kahrs | 143—90 |
| 2,223,319 | 7/1943 | Finnell | 143—89 |
| 3,008,499 | 11/1961 | Hollien | 143—89 |
| 3,028,888 | 4/1962 | Chapin et al. | 143—89 |

DONALD R. SCHRAN, *Primary Examiner.*